United States Patent [19]

Hughan

[11] Patent Number: 4,471,560

[45] Date of Patent: Sep. 18, 1984

[54] ANIMAL TRAP

[76] Inventor: Peter H. Hughan, P.O. Box 639, Terrace, British Columbia, Canada

[21] Appl. No.: 259,771

[22] Filed: May 1, 1981

[51] Int. Cl.$^3$ .......................................... A01M 23/34
[52] U.S. Cl. .......................................... 43/85; 43/86
[58] Field of Search .......................... 43/85, 86, 81, 88

[56] References Cited

U.S. PATENT DOCUMENTS

| 75,438 | 3/1868 | Marshall | 43/86 |
|---|---|---|---|
| 326,513 | 9/1885 | Moore | 43/85 |
| 465,056 | 12/1891 | Edwards | 43/86 |
| 551,412 | 12/1895 | Stephens | 43/86 |
| 1,463,163 | 7/1923 | Greenstreet et al. | 43/86 |
| 1,481,222 | 1/1924 | Odatey | 43/85 |
| 1,496,421 | 6/1924 | Koranicki | 43/85 |
| 1,881,871 | 10/1932 | Nerby | 43/85 |
| 1,899,641 | 2/1933 | Schwartz et al. | 43/86 |
| 2,752,723 | 7/1956 | Lutsky | 43/85 |
| 3,962,814 | 6/1976 | Steiner | 43/86 |

Primary Examiner—Nicholas P. Godici
Assistant Examiner—Kurt Rowan
Attorney, Agent, or Firm—Townsend and Townsend

[57] ABSTRACT

An animal trap comprises an enclosure with an open end. An apertured member is connected to the enclosure for pivoting parallel to the plane defined by the open end. The member can pivot between a set position where the aperture coincides with the open end of the enclosure and a released position where the member is pivoted away from the enclosure. A spring biases the member to the released position. A catch secures the member in the set position. A release including a portion for securing bait can release the member, allowing it to pivot to the released position. An animal intruding through the aperture of the pivotable member and the open end of the enclosure and disturbing the bait will be struck and caught in the region of the animal's neck between the pivotable member and the enclosure as the pivotable member pivots to the released position.

7 Claims, 1 Drawing Figure

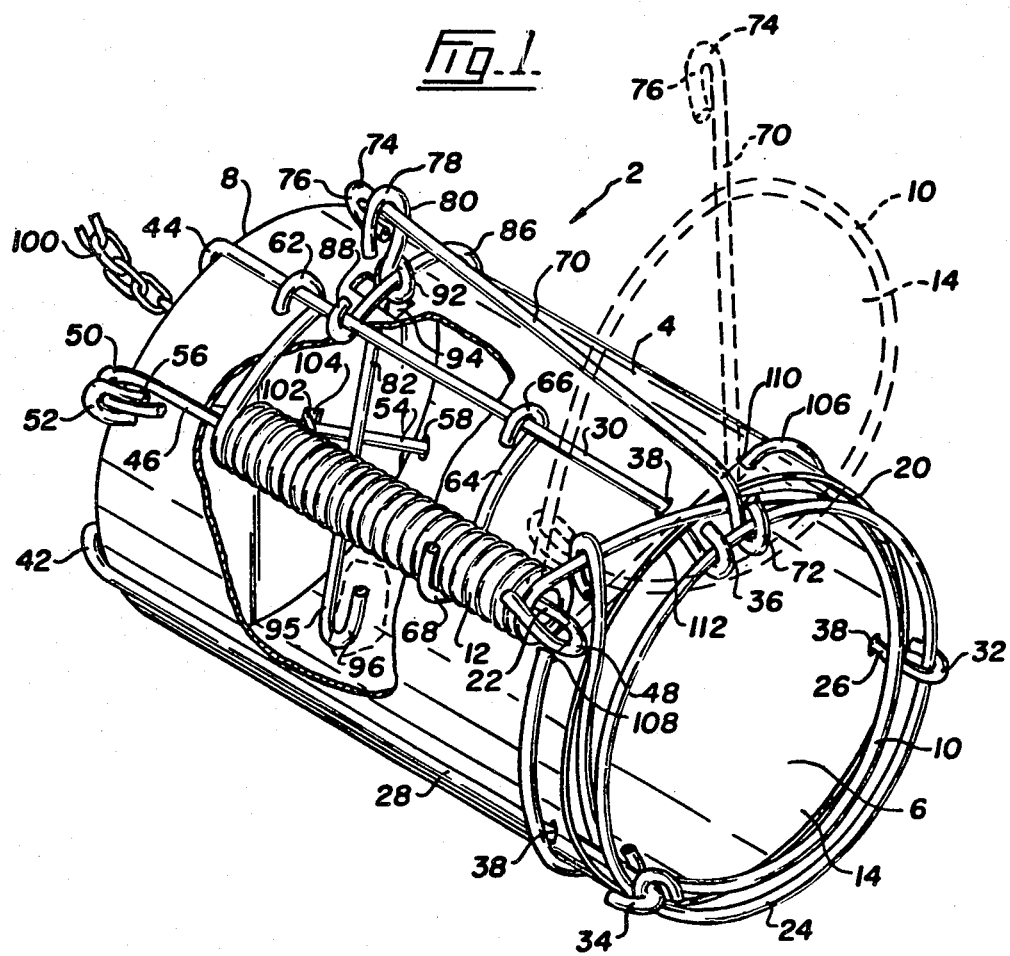

ANIMAL TRAP

FIELD OF THE INVENTION

This invention relates to an animal trap.

DESCRIPTION OF THE PRIOR ART

In recent years, considerable public interest has been aroused concerning the trapping of fur bearing mammals. It has frequently been argued that many traps presently used, including leg-hold traps, are inhumane and result in a lingering death for the animal. Many proposals have been made for more humane traps. However, many of these alternative traps do not provide the configuration required for the trapping of arboreal mammals. Additionally, prior art traps do not provide reliable means for striking the animal in the neck, one of the most likely places to provide a quick death.

SUMMARY OF THE INVENTION

According to a broad aspect of this invention, there is provided an animal trap comprising an enclosure with a forward open end generally defining a plane. A pivotable first loop with a central aperture is pivotably connected to the enclosure for pivoting parallel to the plane between a set position, where the central aperture coincides with at least part of the open end of the enclosure, and a released position where the first loop is pivoted away from the enclosure. A second loop is provided which is fixedly connected to the enclosure adjacent the second loop. A resilient means biases the first loop to the released position. A catch means releasably secures the first loop in the set position. A release means releases the catch means and allows the resilient means to pivot the first loop to the released position. The release means has a bait securing portion located within the enclosure. The loops, the catch means, and the release means being arranged so that an animal intruding through the central aperture of the first loop when in the set position and the open end of the enclosure and disturbing the bait will be struck and caught in the region of the animal's neck between the first and second loops as the first loop pivots to the released position.

When compared to prior art traps, a trap according to the present invention offers significant advantages. In providing a humane trap, an important feature of the invention is that the animal is struck and caught in the region of its neck. The animal is usually killed when the neck is broken. If this does not occur, then the blow given to the animal by the first loop in the region of the thyroid glands is normally fatal. If the blow is not fatal, it nearly invariably renders the animal unconscious and death results from restriction of its blood flow to the brain or air supply.

Additionally, since the animal is struck only in the region of the ncek, the pelt is not damaged by the trap. The trap is also light in weight and compact. This is particularly important where the trapper must carry a number of traps. If he desires, the trapper can bait and scent the trap at home to reduce the time required to set up traps along his trap line.

DESCRIPTION OF THE DRAWINGS

FIG. 1 is an isometric view of a trap according to an embodiment of the invention.

DESCRIPTION OF THE PREFERRED EMBODIMENTS

FIG. 1 illustrates a trap according to one embodiment of the invention. The trap 2 has an enclosure 4 comprising a cylindrical container with an open forward end 6 and a closed rearward end 8. In smaller versions of the trap suitable for trapping small animals such as squirrels, enclosure 4 may comprise an empty food tin. The size of the trap 2 will depend upon the animals to be caught. Larger versions of the trap can be made for trapping animals such as wolverines.

A pivotable member or first loop in the form of a first circular hoop 10, preferably of steel wire, is pivotably connected to the enclosure 4 by means of torsional coil spring 12. For the embodiment shown, hoop 10 and spring 12 comprise a single length of steel wire. As shown, hoop 10 can pivot between the set position shown in solid lines and the released position shown in broken lines. In the set position, the central aperture 14 of hoop 10 generally coincides with the open end 6 of enclosure 4. In the released position, hoop 10 is pivoted away from enclosure 4. In pivoting between the released position and the set position, hoop 10 pivots in a plane which is parallel to the plane defined by the circular outer edge 20 at open 6 of enclosure 4. Hoop 10 pivots about the centre 22 of spring 12 which is adjacent the circular outer edge 20 of enclosure 4.

A first loop in the form of a circular stationary hoop 24 is connected to the enclosure 4 about the open end 6. In the present embodiment of the invention, hoop 24 is of steel wire. Hoop 24 is located slightly further from open end 6 of enclosure 4 than first hoop 10.

Hoop 24 is connected to enclosure 4 by means of three generally straight wires 26, 28 and 30 which extend towards the closed end 8 of the enclosure 4. Wires 26, 28 and 30 are tightly crimped around hoop 24 to provide loops 32, 34 and 36 at first ends of each wire. From hoop 24, wires 26, 28 and 30 pass into the interior of enclosure 4 and then pass to the exterior of enclosure 4, each through a similar aperture 38 in enclosure 4. The wires 26, 28 and 30 extend along the outside of enclosure 4 and are secured in apertures in closed end 8 of enclosure 4 by means of loops 40 (not shown), 42 and 44 which are similar to loops 32, 34 and 36.

Referring again to coil spring 12, spring 12 comprises tightly coiled steel wire extending between open end 6 and closed end 8 of enclosure 4. As mentioned, the end of spring 12 adjacent open end 6 forms pivotable hoop 10. A wire 46 extends through the centre 22 of coil spring 12 and a first end adjacent open end 6 of enclosure 4 forms a loop 48. The second end of wire 46 adjacent closed end 8 of container 4 forms a loop 50. Loop 50 is tightly crimped with a corresponding loop 52 of wire 54 which spans the inside of closed end 8 of enclosure 4 diametrically. Wire 54 passes through enclosure 4 at aperture 56 adjacent loop 52. The opposite end of wire 54 passes through an aperture 58 in container 4 and forms a loop 60 (not shown) crimped around the outside of closed end 8 of enclosure 4. The end of coil spring 12 adjacent closed end 8 extends towards wire 30 and forms a loop 62 crimped about wire 30. A wire 64 extends between wire 30 and coil spring 12 generally midway along coil spring 12. A loop 66 of wire 64 is crimped around wire 30 and a loop 68 is crimped about coil spring 12. Coil spring 12 comprises resilient means biasing hoop 10 to the released position shown in broken lines.

A first rod 70, again a length of steel wire, has a loop 72 loosely crimped about hoop 24. In the set position of trap 2, rod 70 extends along the outside of enclosure 4 longitudinally towards closed end 8. In the set position, rod 70 presses against pivotable hoop 10 to retain it in the set position shown in solid lines. The end 74 of rod 70 distal open end 6 is formed into a second loop 76. In the set position, distal end 74 of rod 70 is held adjacent enclosure 4 by means of loop 78 at first end 80 of a second rod 82, again of steel wire.

A curved wire 86 extends circumferentially about enclosure 4 from wire 30 to wire 26. A loop 88 is crimped around wire 30 and a loop 90 (not shown) is crimped around wire 26. Rod 82 has a loop 92 formed loosely around wire 86 where rod 82 passes through aperture 94 of enclosure 4. A second end 95 of rod 82 is located inside enclosure 4 and near the closed end 8 of the enclosure. Second end 95 is formed with a hook 96 for securing bait in the trap. Rod 92 is pivotable about wire 86 at aperture 94 for movement towards, and away from, the open end 6 of the enclosure 4. The second rod 82 comprises release means for releasing first rod 70 and allowing the torsional spring 12 to pivot the pivotable hoop 10 to the released position shown in broken lines.

A chain 100 has a link 102 adjacent closed end 8 of enclosure 4. Link 102 passes through an aperture 104 in closed end 8 and wire 54 passes through link 102 to connect chain 100 to the trap 2.

Near the open end 6 of enclosure 4, a wire 106 passes circumferentially about the outside of enclosure 4 between apertures 108 and 110 in enclosure 4. Between apertures 108 and 110, a straight section 112 of wire 106 extends across the open end 6 of the enclosure 4. Straight section 112 constitutes a straight rod spaced from the circular edge 20 at open end 6.

In use, the trap 2 is first baited by securing the bait to hook 96 of second rod 82. Holding the enclosure 4 in one hand and hoop 10 in the other hand, hoop 10 is rotated from the released position to the set position about centre 22 of spring 12 in a clockwise direction from the point of view of FIG. 1. With second end 95 of second rod 82 raised towards open end 6 and loop 80 of rod 82 rotated away from end 6, first rod 70 is positioned over hoop 10 and distal end 74 of rod 70 is held against the enclosure 4 as shown. Rod 70 then holds hoop 10 in the set position. Second end 95 and hook 96 of rod 82 are then pivoted towards closed end 8 of enclosure 4, moving loop 80 towards open end 6 and over distal end 74 of first rod 70. The trap 2 is then in the set position and can be placed in a location appropriate for the animals to be trapped. For the trapping of arboreal mammals, the trap 2 is normally placed on a platform in a tree. The end of chain 100 distal trap 2 is secured to the tree trunk, for example by a staple.

When an animal approaches trap 2, attracted by the bait, the only approach to the bait on hook 96 is through the centre of hoop 24, through aperture 14 of hoop 10, through the open end 6 of enclosure 4 and through the enclosure 4 to the bait. When the animal reaches the bait on hook 96 and attempts to pull it away, end 95 of second rod 82 is pulled towards open end 6 of enclosure 4, moving loop 80 of second rod 82 towards the closed end 8 and away from the open end 6. When loop 80 reaches distal end 74 of first rod 70, rod 70 moves away from enclosure 4 about loop 72 as hoop 10 pushes it under the pressure of spring 12. Spring 12 is relatively strong and hoop 10 swings quickly outwards in the counterclockwise direction, from the point of view shown in FIG. 1, towards the released position. However, the released position is not fully achieved since the animal is caught between hoop 10 and the circular edge 20 of enclosure 4, as well as between hoop 10 and rod 112 and between hoop 10 and hoop 24. The distance between hook 96 and hoop 10 when distal end 74 of second rod 70 is released is such that the animal's neck is adjacent open end 6 of enclosure 4. Consequently, hoop 10 strikes the animal's neck and catches it between the hoop 10 and the other parts of trap 2 already mentioned, particularly third rod 112. Almost invariably, this results, in a quick, humane death for the animal. Of course, the diameter of enclosure 4, the distance between hook 96 and open end 6 and other dimensions of the trap 2 will depend upon the animals for which the trap is designed.

While in this embodiment enclosure 4 is a cylindrical container with one open end, other enclosures provided with a similar opening could readily be devised and are within the scope of this invention. Additionally, some of the other features of the trap described above can be varied within the scope of the invention.

What I claim is:

1. An animal trap comprising:
   an enclosure with an open forward end generally defining a plane;
   a pivotable first loop with a central aperture pivotably connected to the enclosure for pivoting parallel to the plane between a set position, where the central aperture coincides with at least part of the open end of the enclosure, and a released position where the first loop is pivoted away from the enclosure;
   a second loop fixedly connected to the enclosure adjacent and forward of the first loop when in the set position;
   a straight rod extending across the open end of the enclosure;
   a resilient means biasing the first loop to the released position;
   a catch means for releasably securing the first loop in the set position;
   and a release means for releasing the catch means and allowing the resilient means to pivot the first loop to the released position, the release means having a bait securing portion location within the enclosure;
   the loops, the straight rod, the catch means, and the release means being arranged so that an animal intruding through the central aperture of the first loop when in the set position, and the open end of the enclosure, and disturbing the bait will be struck and caught in the region of the animal's neck between the first and second loops and the straight rod, as the first loop pivots to the released position.

2. A trap as described in claim 1 wherein the straight rod is positioned rearward of the first and second loop, and wherein the first loop is connected to the enclosure so as to pivot about a position near the outer edge of the open end.

3. A trap as described in claim 2 wherein said resilient means comprises an elongated torsional spring extending lengthwise along the enclosure, a forward end of the spring being connected to the first loop.

4. A trap as described in claim 2 wherein the catch means comprises a first rod pivotally connected to the second loop and extending outside and along the housing, so that when the trap is in the set position the first rod abuts an outer side of the first loop and releasably secures it; and wherein the release means comprises means for releasably securing a rearward end of the first rod when the trap is in the set position.

5. A trap as claimed in claim 4 wherein the release means comprises:
   (a) a second rod extending through an aperture in the enclosure adjacent the rearward end of the first rod when the trap is in the set position, the second rod being pivotably connected to the enclosure adjacent the aperture for movement toward, and away from the open end of the enclosure; and
   (b) means for releasably securing comprising a loop near a first end of the second rod outside the enclosure, which loop engages the rearward end of the first rod when the trap is in the set position;

the bait securing portion of the release means being near a second end of the second rod inside the enclosure, so that when the bait securing portion is pulled forwardly by the animal, the loop near the first end of the second rod is moved rearward, disengaging the rearward end of the first rod and releasing the hoop.

6. A trap as described in claim 3 wherein the enclosure is cylindrical with the entire forward end being open, and wherein the first and second loops are circular hoops of diameters substantially equal to the enclosure and axially aligned therewith when the trap is in the set position.

7. A trap as described in claim 5 wherein the enclosure is cylindrical with the entire forward end being open, and wherein the first and second loops are circular hoops of diameters substantially equal to the enclosure and axially aligned therewith when the trap is in the set position.

* * * * *